(12) United States Patent
Murata et al.

(10) Patent No.: US 7,783,327 B2
(45) Date of Patent: *Aug. 24, 2010

(54) MOBILE STATION

(75) Inventors: Syuuichi Murata, Yokohama (JP);
Akihide Otonari, Kasuya (JP); Yuka Araikawa, Fukuoka (JP); Junichi Niimi, Kunitachi (JP); Atsushi Tanaka, Yokohama (JP); Takahiro Matusaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 697 days.

This patent is subject to a terminal disclaimer.

(21) Appl. No.: 11/145,922

(22) Filed: Jun. 7, 2005

(65) Prior Publication Data

US 2006/0035664 A1 Feb. 16, 2006

(30) Foreign Application Priority Data

Aug. 16, 2004 (JP) ............................. 2004-236831
Sep. 1, 2004 (JP) ............................. 2004-254954

(51) Int. Cl.
*H04M 1/00* (2006.01)
*H04B 1/38* (2006.01)

(52) U.S. Cl. .................... 455/567; 455/67.13; 455/509; 455/515

(58) Field of Classification Search .............. 455/67.13, 455/509, 515, 550.1, 565, 567
See application file for complete search history.

(56) References Cited

U.S. PATENT DOCUMENTS 7,330,700 B2* 2/2008 Aizawa ................... 455/67.13

2003/0035403 A1* 2/2003 Choi et al. .................. 370/342
2003/0119557 A1* 6/2003 Lundby ...................... 455/561
2004/0058687 A1* 3/2004 Kim et al. ................ 455/452.2
2005/0022098 A1* 1/2005 Vayanos et al. ............. 714/776

FOREIGN PATENT DOCUMENTS

WO WO 02/096006 A 11/2002

OTHER PUBLICATIONS

3rd Generation Partnership Project; Technical Specification Group Radio Access Network; Multiplexing and channel coding (FDD) (Release 6) 3GPP TS 25.212 V6.2.0 (Jun. 2004).*
3GPP TS 25.212 v6.2.0 (Jun. 2004); $3^{rd}$ Generation Partnership Project; Technical Specification Group Radio Access Network; Muiltiplexing and Channel Coding (FDD) (Release 6).

(Continued)

*Primary Examiner*—Tuan H Nguyen
(74) *Attorney, Agent, or Firm*—Hanify & King, P.C.

(57) ABSTRACT

A mobile station receives a first datum and transmits a first reception result with a first timing when a first notification was received via a channel which notifies that data is to be transmitted, and receives a second datum and transmits a second reception result with a second timing when a second notification with a different timing was received via said channel, said mobile station being characterized in that it comprises: a repeat transmission unit which, upon receiving said first notification, transmits said first reception result with said first timing, and repeats the transmission with said second timing; and a control unit which imposes a restriction on the reception processing control of said second notification when said first notification has been received.

4 Claims, 5 Drawing Sheets

OTHER PUBLICATIONS

3GPP TS 25.214 v6.2.0 (Jun. 2004); $3^{rd}$ Generation Partnership Project; Technical Specification Group Radio Access Network Physical Layer Procedures (FDD) (Release 6).

Official Communication dated May 6, 2008 which accompanies a European Search Report and a European Search Opinion for the corresponding European application No. 05253763.6-1237; Abstract.

European Patent Convention Office Action dated Jul. 20, 2009.

* cited by examiner

MOBILE STATION

CROSS REFERENCE TO RELATED APPLICATION

This application is related to and claims priority to Japanese Applications No. 2004-254954 filed Sep. 1, 2004, and No. 2004-236831 filed Aug. 16, 2004, in the Japanese Patent Office, the contents of which are incorporated by reference herein.

BACKGROUND OF THE INVENTION

1. Field of the Invention

The present invention relates to mobile stations, such as mobile stations in a mobile wireless communication system using a W-CDMA communication protocol.

2. Description of the Related Art

Currently, standardization of the W-CDMA (UMTS) protocol, a protocol for third generation mobile communication systems, is proceeding under the 3GPP (3rd Generation Partnership Project). HSDPA (High Speed Downlink Packet Access), which provides a maximum downlink transfer speed of approximately 14 Mbps, has been specified as one of the themes for standardization.

HSDPA is characterized in that it employs an adaptive modulation and coding (AMC) scheme, switching for example between the QPSK modulation scheme and 16-QAM scheme adaptively according to the wireless environment between the base station and mobile station.

Furthermore, HSDPA employs an H-ARQ (Hybrid Automatic Repeat ReQuest) scheme. Under H-ARQ, when a mobile station detects an error in data received from a base station, a retransmission request is made by the mobile station in question to the base station. The base station performs retransmission of data upon receiving this retransmission request, and thus the mobile station performs error correction decoding using both the already received data and the retransmitted received data. In this way, H-ARQ increases the gain of error correction decoding and reduces the number of retransmissions by effectively utilizing already received data, even if it contains errors.

The main wireless channels used in HSDPA include HS-SCCH (High Speed-Shared Control Channel), HS-PDSCH (High Speed-Physical Downlink Shared Channel) and HS-DPCCH (High Speed-Dedicated Physical Control Channel).

HS-SCCH and HS-PDSCH are both downlink (i.e. in the direction from the base station to the mobile station) shared channels. HS-SCCH is a control channel for transmitting various parameters relating to the data transmitted on HS-PDSCH. In other words, it is a channel which notifies (announces) that data is to be transmitted via HS-PDSCH.

The various parameters include, for example, modulation scheme information indicating which modulation scheme is used to transmit data on HS-PDSCH, the spreading code allocation number (code number), information on the rate matching pattern applied to the transmitted data, etc.

Furthermore, HS-DPCCH is an uplink (in the direction from the mobile station to the base station) dedicated control channel, which is used by the mobile station for sending ACK or NACK signals to the base station depending on whether or not there was an error in the data received via HS-PDSCH. Namely, it is a channel used for transmitting the reception result for data received via HS-PDSCH. If the mobile station fails to receive data (if the received data has a CRC error, etc.), a NACK signal will be transmitted from the mobile station and the base station will accordingly perform retransmission control.

In addition, HS-DPCCH is used by a mobile station, which has determined the reception quality (e.g. SIR) of the signal received from the base station, to transmit the results thereof periodically to the base station as CQI (Channel Quality Indicator) information. The base station judges the goodness of the downstream wireless environment based on the received CQI information, and if it is good, switches to a modulation scheme allowing transmission of data at higher speed, or switches to a modulation scheme which transmits data at a lower speed if the wireless environment is not good (i.e., performs adaptive modulation).

Channel Structure

Next, the channel configuration of HSDPA will be described.

FIG. 1 is a drawing which illustrates the channel configuration of HSDPA. Since W-CDMA employs a code division multiplexing scheme, the individual channels are separated by code.

First, the channels which have not been explained will be briefly described.

CPICH (Common Pilot Channel) and SCH (Synchronization Channel) are downlink shared channels.

CPICH is a channel for transmitting a so-called pilot signal, and is used by the mobile station for channel estimation, cell search and as timing reference for other downlink physical channels in the same cell. SCH strictly speaking includes P-SCH (Primary SCH) and S-SCH (Secondary SCH), and is a channel transmitted in bursts in 256 chips at the head of each slot. SCH is received by mobile stations which perform three-step cell search and is used for establishing slot synchronization and frame synchronization.

Next, the timing relationship of the channels will be described using FIG. 1.

As shown in the drawing, in each channel, one frame (10 ms) consists of 15 slots (each slot comprises a 2560 chip length). As described above, CPICH is used as a reference for other channels, so the head of the P-CCPCH and HS-SCCH frames is aligned with the head of the CPICH frame. Here, the head of the HS-PDSCH frame is delayed by 2 slots relative to HS-SCCH, etc., which is to make it possible for the mobile station to perform demodulation of HS-PDSCH with the modulation scheme corresponding to the received modulation scheme after receiving modulation scheme information via HS-SCCH. Furthermore, HS-SCCH and HS-PDSCH comprise sub-frames of 3 slots.

HS-DPCCH is an uplink channel. Its first slot is used for transmitting an ACK/NACK signal indicating the HS-PDSCH reception result from the mobile station to base station approximately 7.5 slots after the HS-PDSCH reception. Furthermore, the second and third slots are used for periodically transmitting CQI information as feedback for adaptive modulation control to the base station. Here, the transmitted CQI information is calculated based on the reception environment (e.g. the SIR determination result for CPICH) as determined in the period from 4 slots until 1 slot before the CQI transmission.

The ACK and NACK signals used for notifying whether reception of HS-PDSCH was or was not possible may be repeated multiple times depending on the settings.

Namely, as illustrated in FIG. 1, having received an HS-PDSCH transmission announcement in the first sub-frame (A) of HS-SCCH, the mobile station demodulates and decodes HS-PDSCH (first sub-frame E), which is delayed by two slots, performs a CRC check, and detects if any error is present.

Here, in the case where a determination of no error was made, as shown in the drawing, an ACK signal is transmitted in the first slot (slot C in the drawing) of the sub-frame delayed by approximately 7.5 slots from the HS-PDSCH reception, and transmission of the same ACK signal is repeated in the first slot (slot D in the drawing) of the subsequent sub-frame. Of course, if there was an error, a NACK signal would be repeatedly transmitted.

It is of course also possible to not have the reception result transmitted repeatedly, but repeating the transmission of the ACK signal or NACK signal N times in this manner (N is a natural number) ensures more reliable reception of the ACK signal or NACK signal by the base station and prevents unneeded retransmission control.

However, in order for transmission of the ACK signal or NACK signal to be repeated in the next sub-frame, HS-PDSCH cannot be transmitted to the same mobile station in the following N sub-frames, including the next sub-frame (F).

This is in order to prevent losing the ability to distinguish between whether the ACK signal (slot D in the drawing) is the repeated transmission of the reception result (ACK or NACK signal) relating to the first sub-frame E of HS-PDSCH corresponding to the first sub-frame A of HS-SCCH, or the initial transmission of the reception result (ACK or NACK signal) relating to the second sub-frame F of HS-PDSCH corresponding to the second sub-frame B of HS-SCCH.

Next, the content and coding procedure of the data transmitted on HS-SCCH will be described.

Data Transmitted on HS-SCCH

The following data are transmitted on HS-SCCH. These data are used for reception processing of HS-PDSCH, which is transmitted after a 2 slot delay.

(1) $X_{ccs}$ (Channelization Code Set information)
(2) $X_{ms}$ (Modulation Scheme information)
(3) $X_{tbs}$ (Transport Block Size information)
(4) $X_{hap}$ (Hybrid ARQ Process information)
(5) $X_{rv}$ (Redundancy and constellation Version)
(6) $X_{nd}$ (New Data indicator)
(7) $X_{ue}$ (User Equipment identity)

(1) through (7) will now be described.

(1) Xccs is a datum indicating the spreading code used for transmitting data on HS-PDSCH (e.g. a datum indicating a multi-code number and code offset combination), and consists of 7 bits.

(2) Xms is a datum indicating that the modulation scheme used on HS-PDSCH is either QPSK or 16-QAM, and consists of 1 bit.

(3) Xtbs is a datum used for computing the transport block size of data transmitted on HS-PDSCH (the size of data transmitted in one HS-PDSCH sub-frame), and consists of 6 bits.

(4) Xhap is a datum indicating the H-ARQ process number, and consists of 3 bits. The base station is unable to judge whether or not data was successfully received by the mobile station until the base station receives an ACK or NACK. However, if one were to wait until receiving an ACK or NACK before transmitting a new data block, the transport efficiency would drop. Thus, to allow transmission of new data blocks before an ACK or NACK is received, a process number is defined for each data block transmitted in a sub-frame, and the mobile station discriminates the reception processing it performs according to the process number. In other words, when performing retransmission, the base station assigns a process number to transport blocks under the condition that the same process number is assigned as that of the previously sent block, and transmits it via HS-SCCH as Xhap.

Therefore, the mobile station classifies the data received via HS-PDSCH based on the Xhap it has received, distinguishing between new transmission and retransmission within a data stream for which the same process number was provided via HS-SCCH based on Xnd, which will be discussed under (6), combining new data with retransmitted data, and the like.

(5) Xrv is a datum indicating the redundancy version (RV) parameters (s, r) and constellation version parameter (b) for HS-PDSCH retransmission, and consists of 3 bits.

s is a bit which indicates whether or not systematic bits are to be prioritized in the rate matching, which will be described later. For example, if s=1, the systematic bits are prioritized, and if s=0, the systematic bits are not prioritized. r indicates the bit pattern of puncture and repetition and b indicates the constellation rearrangement pattern for rate matching.

During retransmission, considering the combining on the receiving side, it is desirable to vary the transmitted bits or change the constellation arrangement, so Xrv is used by cycling it between 0 and 7. Furthermore, since there is no need to change Xrv for each initial transmission, the initial value for new transmissions can be fixed.

(6) Xnd is a datum indicating whether the block transmitted on HS-PDSCH is a new block or a retransmitted block, and consists of 1 bit. For example, when transmitting a new block, it would be switched from 0 to 1 or from 1 to 0, and for retransmission, it would not be switched and the same value would be used.

For example, when performing new transmission, retransmission, new transmission, retransmission, retransmission and new transmission in that order, the bits would change as follows: 1, 1, 0, 0, 0, 1.

(7) Xue is a datum indicating mobile station identification information, and consists of 16 bits.

"Coding of data transmitted on HS-SCCH"

FIG. 2 is a drawing illustrating the coding procedure (coding device) for the aforementioned data (1) through (7) which are transmitted on HS-SCCH. This coding is performed mainly by the base station.

In the drawing, 1 is a coding unit, 2 is a rate matching unit, 3 is a multiplier, 4 is a CRC computation unit, 5 is a multiplier, 6 is a coding unit, 7 is rate matching unit, 8 is a coding unit and 9 is a rate matching unit.

Next, the operation of each block will be explained.

(1) Xccs, represented by 7 bits (x1,1~x1,7), and (2) Xms, represented by 1 bit (x1,8), are input into the coding unit 1 as a datum of 8 bits total. Here, the first number of the subscript signifies that this relates to data transmitted in the first part (first slot), and the second number, separated by a comma (,), indicates the number of the bit.

Coding unit 1 appends 8 tail bits to the input data and performs convolution coding with a code rate of ⅓ on the total of 16 bits. Therefore, the coded data becomes a total of 48 bits, and is supplied as z1,1~z1,48 to the rate matching unit 2. Rate matching unit 2 performs puncture or repetition processing or the like on specific bits to adjust them to a bit number that will fit into the first slot (here, assumed to be 40 bits), and outputs the result (r1,1~r1,40).

Data from the rate matching unit 2 is multiplied with c1~c40 by the multiplier 3 and output as s1,1~s1,40, and is transmitted in the first slot (first part), which is the slot at the head of the sub-frame of HS-SCCH in FIG. 1.

Here, c1~c40 are obtained by taking data from (7) Xue (xue1~xue16), appending 8 tail bits thereto and then convolution coding with a coding rate of ½ in coding unit 8 to obtain b1~b48, and further performing the same sort of bit adjustment in rate matching unit 9 as was done in rate matching unit 2.

Meanwhile, the 6-bit (3) Xtbs (x2,1~x2,6), 3-bit (4) Xhap (x2,7~x2,9), 3-bit (5) Xrv (x2,10~x2,12) and 1-bit (6) Xnd (x2,13) are input as a total of 13 bits y2,1~y2,13 together with the 16-bits y2,14~y2,29, for a total of 29 bits y2,1~y2,29, into coding unit 6.

Here, y2,14~y2,29 are obtained by performing CRC computation processing on the total of 21 bits of (1) through (6) in the CRC computation unit 4 and multiplying c1~c16, as the result of the computation, by (7) Xue (xue1~xue16).

The y2,1~y2,29 which are input into coding unit 6 have 8 tail bits added thereto and are convolution coded with a ⅓ coding rate and input as 111-bit data z2,1~z2,111 into the rate matching unit 7.

The rate matching unit 7 outputs 80 bits, r2,1~r2,80, by means of the aforementioned puncture or other such processing, and these r2,1~r2,80 are transmitted in the second part (second and third slots) in 1 sub-frame on HS-SCCH in FIG. 1.

As described above, the data of (1) and (2) are transmitted in the first slot, while (3) through (6) are transmitted in the second through third slots, thus being transmitted distinctly in separate slots; on the other hand, the CRC computation is carried out on them in common, with the CRC computation result being transmitted within the second slot, so detection of reception error becomes possible once both the first and second parts are completely received.

Furthermore, since the data to be transmitted in the first slot is convolution coded by coding unit 1 and then multiplied by (7) Xue in the multiplier 3, when data addressed to another station is received in the first slot, the likelihood generated in the decoding process will be smaller compared to if the data were addressed to the receiving station, thus making it possible to know if there is a high probability of the data not being addressed to the receiving station by comparing the likelihood to a reference value.

"Coding of data transmitted on HS-PDSCH"

Next, the process until the transmission data is transmitted via HS-PDSCH will be described using a block diagram.

FIG. 3 is a diagram illustrating a wireless base station.

In the drawing, 10 represents a control unit which successively outputs the transport data to be transmitted via HS-PDSCH (the data transmitted within one sub-frame) as well performing control of the various units (11 through 26, etc.). The values of (1) through (7) explained in FIG. 2 are given by this control unit 10.

Since HS-PDSCH is a shared channel, it is permitted for the successively output transport data to be addressed to different mobile stations.

11 represents a CRC attachment unit which performs CRC computation on the successively input transport data (data transmitted within the same wireless frame) and attaches the results of CRC computation to the tail of the transport data, and 12 represents a bit scrambling unit which imparts randomness to the transmitted data by applying a bit-unit scramble to the transport data with the CRC computation results attached thereto.

13 represents a code block segmentation unit which segments (e.g. into two equal parts) the input bit-scrambled transport data if it exceeds a certain data length, for the purpose of preventing the computation load of the receiving side decoder from increasing due to excessive length of the data to be coded in the subsequently performed channel coding, or for other purposes. The drawing shows a case where the input data length exceeded a specific data length and the output has been split into two equal parts (segmented into a first data block and second data block). Of course, cases where the number of segments segmented into is other than two are also possible, as are cases where the segments are not equal parts but have different data length.

14 represents a channel coding unit which performs error correction coding individually on each segmented datum. It is preferable to use a turbo coder for the channel coding unit 14.

Thus, the first output, for the first block, contains the important systematic bits (U) which are the same data as the data subjected to coding, the first redundancy bits (U') obtained by convolution coding of the systematic bits (U), and the second redundancy bits (U") obtained by interleaving and then similarly convolution coding the systematic bits. Likewise, the second output contains the systematic bits (U), first redundancy bits (U') and second redundancy bits (U") for the second block.

15 represents a bit separation unit which separates the first block and second block serially input from the channel coding unit 14 (turbo coder) into systematic bits (U), first redundancy bits (U') and second redundancy bits (U") and outputs them.

16 represents a first rate matching unit which performs rate matching, such as puncturing (thinning), on the input data so that the input data (in cases where data is segmented into multiple blocks, all the data of the segmented blocks) will be of a quantity that fits into a specific region of the subsequent virtual buffer unit 17.

17 represents a virtual buffer unit wherein a region is established by the control unit 10 according to the reception processing capacity of the mobile station to be transmitted to, in which region data rate-matched by the first rate matching unit 16 is buffered. For retransmission, by outputting the buffered data, the processing from the CRC attachment unit 11 to the first rate matching unit 16 can be omitted, but in cases where one wishes to modify the coding rate for retransmission or the like, it is desirable to re-output the transmission data stored in the control unit 10 and not use the buffered data. It is also possible to actually provide no buffer for the virtual buffer 17 and simply make it pass-through. In this case, retransmitted data would be re-output from the control unit 10.

18 represents a second rate matching unit for adjusting data to a length that can fit into a sub-frame designated by the control unit 10; it adjusts the data length of input data by performing puncture (thinning) and repetition processing so as to obtain the designated data length.

This second rate matching unit 18 performs rate matching according to the previously explained RV parameters.

Namely, depending on the RV parameters, when s=1, rate matching is performed so as to leave as many systematic bits as possible, and when s=0, it is permitted on the contrary to reduce the systematic bits and leave more redundancy bits. Furthermore, puncture and rate matching are preformed by a pattern that follows r.

19 represents a bit collection unit which arranges the data from the second rate matching unit 19 into a plurality of bit sequences. Namely, data of the first block and data of the second block are arranged according to a specific bit arrangement method to output a plurality of bit sequences for designating signal points on a phase plane. Since a 16-QAM modulation scheme is used in this embodiment example, the bit sequence consists of 4 bits. When using a 64-QAM modulation scheme, the bit sequence would be made 6 bits, and when using a QPSK modulation scheme, the bit sequence would be made 2 bits.

20 segments and outputs the bit sequences into the same number of branches as the spreading code number indicated by the control unit 10. Namely, it represents a physical channel segmentation unit which, when the code number in the transmission parameters provided by the control unit 10 is N, maps and outputs the input bit sequence sequentially to branches 1 through N.

21 represents an interleaving unit which performs interleaving on the bit sequences of N branches and outputs the result.

22 represents a constellation rearrangement unit for 16-QAM, which is capable of rearranging bits within each input bit sequence. Bit rearrangement is performed according to the previously described constellation version. Examples of bit rearrangement include swapping the high order and low order bits. It is preferable to perform bit swapping for multiple bit sequences according to the same rule.

23 represents a physical channel mapping unit which maps the bit sequences of N branches onto the corresponding spreading block of the subsequent spreading unit 24.

24 represents a spreading unit which comprises multiple spreading blocks, each of which outputs a corresponding I and Q voltage based on each bit sequence of N branches and performs spreading thereon with different spreading codes and outputs the result.

25 represents a modulating unit which combines the signals spread by the spreading unit 24, performs e.g. 16-QAM modulation scheme amplitude phase modulation on the result thereof, amplifies it by means of a variable gain amplifier, further frequency-converts it to a wireless signal, and then outputs it to the antenna side as a wireless signal to enable transmission.

Under HSDPA, it is possible to multiplex signals addressed to other mobile stations within sub-frames of the same timing by means of a spreading code, so it is desirable to provide a plurality of sets of 10 through 25, variable gain amplifier, etc. (these will be referred to as transmission sets), combine the output signals of the variable gain amplifiers, frequency-convert them together, and then transmit the result to the antenna side. Of course, since there is a need to separate by code, for the spreading code used by the spreading unit 24 of each transmission set, a different spreading code would be used so as to allow separation.

26 represents a receiving unit, which receives signals from the mobile station received via HS-DPCCH or the like, and provides ACK and NACK signals, CQI, etc. to the control unit 10.

As discussed above, if an ACK signal is received, the next new data is transmitted, but in the case of a NACK signal or a DTX state where there is no response, the control unit 10 performs retransmission control so as to retransmit the transmitted data.

Of course, as described above if the mobile station repeats the transmission of ACK and NACK signals, control would be performed so that data addressed to that mobile station will not be transmitted in the HS-PDSCH sub-frame corresponding to the repeated ACK signal or NACK signal transmitted by the mobile station, and retransmission control would be performed based on the repeatedly transmitted ACK signal or NACK signal.

Retransmission is limited to the maximum number of retransmissions that is set, and if no ACK signal is received from the mobile station upon reaching the maximum number of retransmissions, control is provided to switch to transmission of the next new data.

In cases where a maximum number of retransmissions is not defined, it is possible to start a timer from a new transmission and switch to transmission of the next new data when a specific time period is detected to have elapsed and no ACK signal has been received.

The foregoing was a description of the names and operation of the various units.

Matters relating to HSDPA as discussed above are disclosed for instance in 3G TS 25.212 (3rd Generation Partnership Project: Technical Specification; Group Radio Access Network; Multiplexing and channel coding (FDD)) and in 3G TS 25.214 (3rd Generation Partnership Project: Technical Specification; Group Radio Access Network; Physical layer procedures (FDD)).

SUMMARY OF THE INVENTION

According to the background art described above, the mobile station receives a channel (HS-SCCH) which notifies that data is to be transmitted, and performs reception of data (HS-PDSCH) upon receiving a notification addressed to the station in question, and to this end, the mobile station performs reception processing (demodulation, decoding, etc.) of the channel (HS-SCCH) via which notifications are conducted, but the reception processing leads to substantial power consumption.

Thus, an objective of the present invention is to reduce power consumption in the mobile station by controlling reception of the channel (HS-SCCH) which notifies that data is to be transmitted.

Providing beneficial effects, not limited to the above objective, derived from the various components of the best mode for practicing the invention as described below and which cannot be obtained from the prior art can also be positioned as an objective of the present invention.

(1) The present invention employs a mobile station which receives a first datum and transmits a first reception result with a first timing when a first notification was received via a channel which notifies that data is to be transmitted, and receives a second datum and transmits a second reception result with a second timing when a second notification with a different timing was received via said channel, said mobile station being characterized in that it comprises: a repeat transmission unit which, upon receiving said first notification, transmits said first reception result with said first timing, and repeats the transmission with said second timing; and a control unit which imposes a restriction on the reception processing with said different timing of said channel which notifies that data is to be transmitted when said first notification is received.

(2) A mobile station as set forth in (1), characterized in that said restriction is a discontinuation of demodulation or decoding.

(3) A mobile station as set forth in (1), characterized in that said restriction is that demodulation or decoding is not performed.

(4) An HSDPA-compatible mobile station which, upon detecting that a message addressed to that mobile station was transmitted via HS-SCCH, receives the corresponding HS-PDSCH sub-frame, and which, when transmitting the reception result, repeats the transmission of said reception result n times, said mobile station being characterized in that it comprises: a control unit which performs control to restrict demodulation or decoding of the first part of the next sub-frame after the HS-SCCH sub-frame on which said detection was performed.

(5) A mobile station as set forth in (4), characterized in that, when said n is 2 or greater, said control unit performs control such that demodulation and decoding are not carried out on the first part of the second and subsequent HS-SCCH subframes after the sub-frame on which said decoding was performed.

According to the present invention, power consumption in the mobile station is reduced by controlling reception of the channel which notifies that data is to be transmitted.

DETAILED DESCRIPTION OF THE PREFERRED EMBODIMENTS

Figure 1:
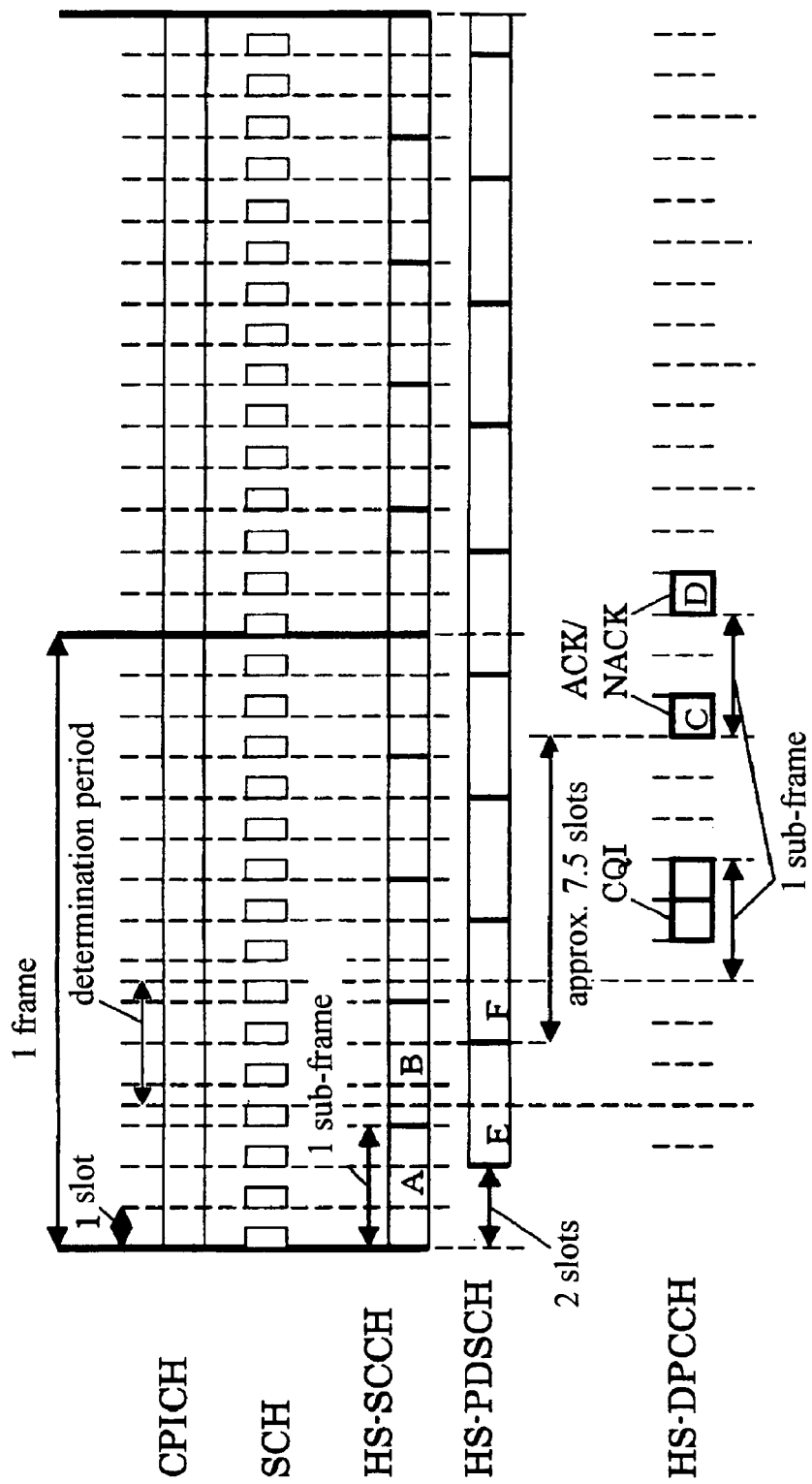
FIG. 1 is a drawing illustrating the channel configuration of HSDPA.
Figure 2:
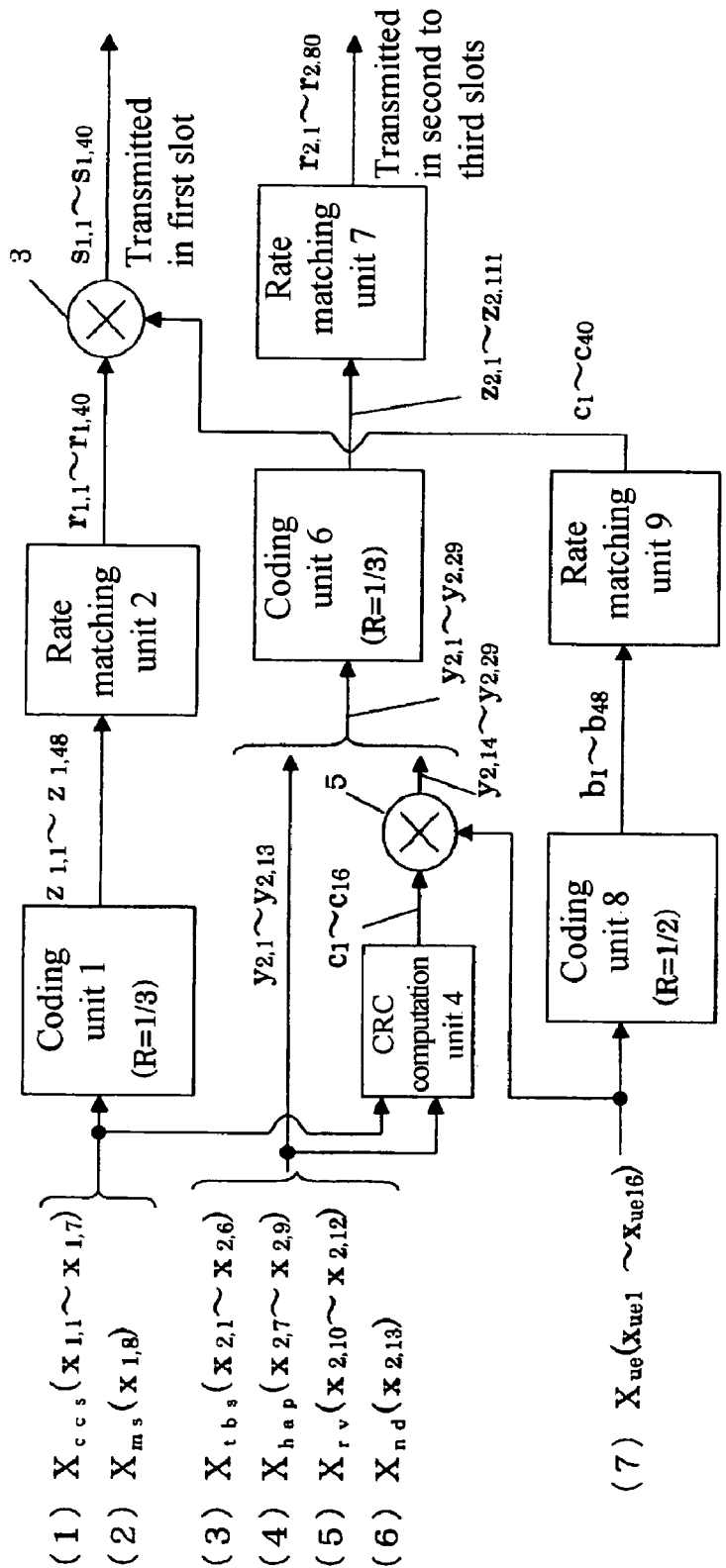
FIG. 2 is a drawing illustrating the HS-SCCH coding unit.

Below, modes for practicing the present invention are described by referring to the drawings.

(a) Description of First Embodiment

Figure 4:
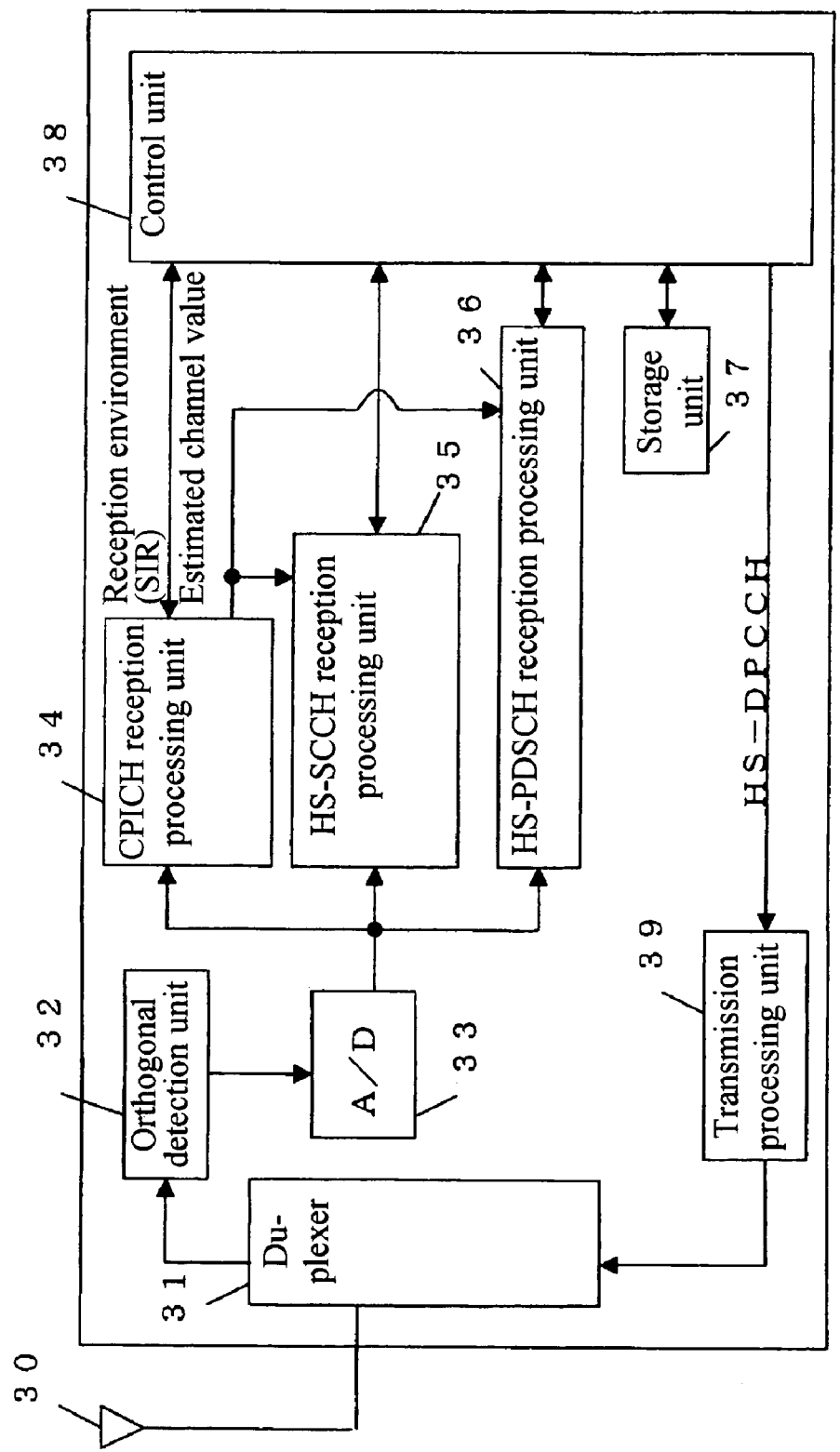
FIG. 4 is a drawing illustrating a mobile station according to the present invention.

FIG. 4 is a drawing illustrating an example of a mobile station according to the present invention. Here, in particular, a mobile station used in an HSDPA-compatible W-CDMA communication system as described above is presented as an example. The present invention can of course also be applied to mobile stations in other communication systems so long as the principles of the present invention are followed.

Figure 3:
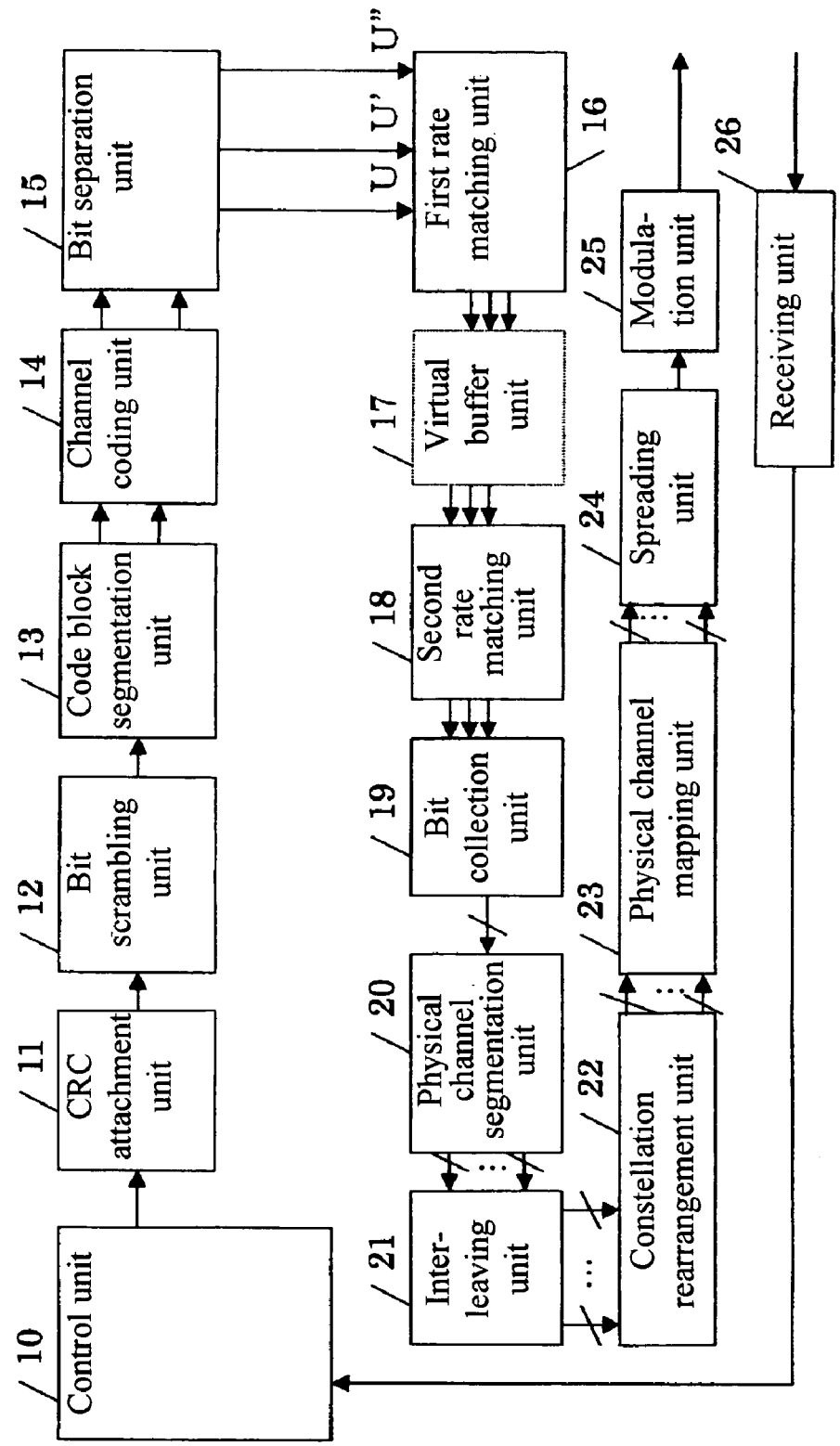
FIG. 3 is a drawing illustrating a transmission device (wireless base station).

The wireless communication device with which wireless communication is conducted can be a wireless base station as illustrated in FIG. 3, the operation of which is as described above.

In the drawing, 30 represents an antenna, 31 represents a duplexer, 32 represents an orthogonal detection unit, 33 represents and A/D conversion unit, 34 represents a CPICH reception processing unit, 35 represents an HS-SCCH reception processing unit, 36 represents an HS-PDSCH reception processing unit, 37 represents a storage unit, 38 represents a control unit, and 39 represents a transmission processing unit.

The mobile station receives downlink channels (e.g. CPICH, P-CCPCH, HS-SCCH, HS-PDSCH) by means of the antenna 30 and inputs the received signal via the duplexer 31 into the orthogonal detection unit 32 to perform orthogonal detection.

Subsequent to orthogonal detection, the signal is converted by the A/D conversion unit 33 into a digital signal. This makes it possible to perform subsequent processing in the digital domain.

The received signal, having been converted to a digital signal, is provided to the CPICH reception processing unit 34, HS-SCCH reception processing unit 35 and HS-PDSCH reception processing unit 36.

The CPICH reception processing unit 34 determines the reception environment used for specifying the CQI information which serves as a parameter used in adaptive modulation control at the base station. As an example, the SIR of the CPICH downlink signal may be determined. Furthermore, the CPICH reception processing unit 34, making use of the fact that the received CPICH is a known signal, computes a channel estimate for compensating for phase rotation, attenuation, etc. of the signal in the propagation path (channel compensation), and provides the channel estimate to the HS-SCCH reception processing unit 35 and HS-PDSCH reception processing unit 36. It is well known that a channel estimate is obtained by evaluating how much the received signal is displaced from a known signal point on a phase plane.

The reception environment is determined regularly, for example in the period from 4 slots until 1 slot before the slot in which CQI information is transmitted. Various cycles of determination are possible. For instance, one can perform the determination once per 20 ms, transmit the same determination result repeatedly in the first through fourth sub-frames, cease transmitting it in the remaining six sub-frames, perform one determination for the next wireless frame, and similarly perform transmission in specific sub-frames.

The HS-SCCH reception processing unit 35 is a reception processing unit for receiving signals transmitted via HS-SCCH as shown in FIG. 1, which performs reception processing such as de-spreading and decoding using a channel estimate for each first slot (first part) of HS-SCCH and provides the decoding result to the control unit 38.

The first slot (first part) is a slot in which a signal is transmitted which is obtained by convolution coding Xccs (Channelization Code Set information) and Mms (Modulation Scheme information) and multiplying by Xue (User Equipment identity). The HS-SCCH reception processing unit 35, after de-spreading, uses the given station's own Xue to perform the reverse of that computation, and then performs decoding, such as Viterbi decoding, and outputs the decoding result to the control unit 38.

If the control unit 38 determines based on the decoding result that the message was addressed to the station in question, a demodulation and decoding instruction for the second part will be issued by the control unit 38, so de-spreading and decoding will be performed on the remaining second and third slots (second part) of HS-SCCH, perform error detection (CRC error detection) processing on the decoded data, and output the decoding result and error detection result to the control unit 38.

The data obtained as the decoding result for the second part of HS-SCCH contains Xtbs (Transport Block Size information), Xhap (Hybrid ARQ Process information), Xrv (Redundancy and constellation Version), Xnd (New Data indicator), etc.

When the HS-SCCH reception processing unit 35 receives a message addressed to the station in question, the HS-PDSCH reception processing unit 36 is instructed by the control unit 38 to execute reception processing.

Therefore, following that instruction, it performs demodulation (de-spreading) and decoding on the received HS-PDSCH, performs error detection (CRC check result) processing on the decoded data, and outputs the decoding result and error detection result to the control unit 38.

Here, the information needed to perform reception processing is obtained by receiving it via HS-SCCH and is indicated via the control unit 38. For example, the control unit 38 may instruct the HS-PDSCH reception processing unit 36 to perform de-spreading with the de-spreading code set indicated by Xccs and to perform demodulation by the demodulation scheme corresponding to the modulation scheme indicated by Xms.

If the error detection result for HS-SCCH is that there was an error, there is a large possibility that the message was not addressed to the receiving station, and thus it is possible to discontinue demodulation and decoding of HS-PDSCH.

The storage unit 37 is used for storing data needed by the control unit 38. For instance, it may store a CQI table. The CQI table contains correlations between reception environment and the parameters (CQI values) used for adaptive modulation control.

The control unit 38 controls the operation of the various units (for example, by controlling the possibility of the operation by giving an enable signal or disable signal), acquires the reception SIR from the CPICH reception processing unit 34, acquires the decoding result and CRC check result from the HS-SCCH reception processing unit 35 and the decoding result and CRC check result from the HS-PDSCH reception processing unit 36, and executes specific processing based on these data.

For example, the control unit 38 may acquire CQI information corresponding to the acquired SIR by looking up information stored in the storage unit 37 and provide it to the transmission processing unit 39, thereby causing it to be transmitted in the second and third slots; determine if there is a message addressed to the mobile station in question based on the decoding result from the HS-SCCH reception processing unit 35, and if so, instruct the HS-PDSCH reception processing unit 36 to perform demodulation and decoding; and generate an ACK signal or NACK signal according to the CRC check result from the HS-PDSCH reception processing unit 36 and provide that signal to the transmission processing unit 9.

As discussed above, the determination of the presence of a message addressed to the station in question can also be performed based on whether the path metric generated by the decoding is below a specific value.

The transmission processing unit 39 transmits the CQI information and ACK signal or NACK signal from the control unit 38 in a specific HS-DPCCH slot.

When the wireless base station instructs (for instance, via an announcement channel) that repeated transmission of ACK signals and NACK signals be performed, this instruction would be received by an unillustrated announcement channel reception unit, and based on this instruction, the control unit 38 would shift to repeat transmission mode, and instruct the transmission processing unit 39 to repeatedly transmit ACK signals and NACK signals.

Preferably, the instruction from the wireless base station will contain the number of repeated transmissions (n), but if such notification is not provided by the wireless base station, one may also preset it (e.g., by storing a flag indicating repeat transmission mode and the number of repeated transmissions (n) in the storage unit 37) and have the control unit 38 refer to this to find out that repeat transmission mode is on and what the number of repeated transmission (n) is.

When in repeat transmission mode, if it is detected that a message addressed to the receiving station was transmitted via HS-SCCH (notification detection), the control unit 38 of the mobile station controls the HS-SCCH reception processing unit 35 such that, when receiving the corresponding HS-PDSCH sub-frame and transmitting the reception result, the reception result will be repeatedly transmitted n times, but demodulation or decoding will be restricted for the first part of the next sub-frame after the HS-SCCH sub-frame in which the notification was detected (preferably, for n sub-frames after the HS-SCCH sub-frame in which the notification was detected).

As explained above, when the wireless base station has instructed that repeat transmission be performed or when the mobile station has been preset to repeat transmission mode, ACK signals and NACK signals are transmitted repeatedly from the mobile station.

Thus, if HS-PDSCH was transmitted to the mobile station in question, the wireless base station performs control such that data is not transmitted via HS-PDSCH to the same mobile station until transmission of the number of sub-frames corresponding to the number of repeats (n) has been completed. Consequently, with regard to HS-SCCH as well, it is assumed that the wireless base station will not transmit messages addressed to the same mobile station until transmission of the number of sub-frames corresponding to the number of repeats (n) has been completed. Therefore, it may be favorable, with respect to reducing the power consumption of the mobile station, to actively restrict reception of HS-SCCH in the mobile station.

The foregoing was an overview of the operation of the units shown in FIG. 4.

Moreover, the base station, based on the CQI information received via HS-DPCCH, performs subsequent transmissions using the corresponding transmission (modulation) scheme, transmits the next new data upon receipt of an ACK signal, and performs retransmission of the transmitted data in case of receiving a NACK signal or if no ACK signal is received within a specific time period after transmission. Here, in cases where the response signal is transmitted repeatedly, if an ACK signal is received once, it can be judged to mean that overall an ACK signal was transmitted, or the reception result which is received most over the repeated transmissions can be judged as being correct.

HS-SCCH Reception Processing

Next, the HS-SCCH reception processing procedure in the mobile station will be described in detail using FIG. 5. The decision processing here is performed in the control unit 38.

First, the control unit 38 determines whether repeat transmission mode is on (step 1).

As explained previously, there are cases where there will be an instruction from the wireless base station to shift to repeat transmission mode, cases where the mode is preset in the control unit 38, and the like.

If repeat transmission mode was determined to be on, the control unit 38 next attempts demodulation and decoding of the first part of HS-SCCH in step 2. The demodulation and decoding is performed by the control unit 38 by controlling the HS-SCCH reception processing unit 35 (e.g. by issuing an enable signal).

Being controlled to perform demodulation and decoding, the HS-SCCH reception processing unit 35 performs de-spreading with a de-spreading code corresponding to HS-SCCH for the first slot of each HS-SCCH sub-frame as shown in FIG. 1, performs decoding, such as Viterbi decoding, on the de-spread signal, and outputs the decoding result to the control unit 38. Based on the decoding result, the control unit 38 determines if there is a message (notification of data transmission) addressed to its station.

To further increase the precision of detection of the presence/absence of notification, one can also determine if Xccs and Xms are undefined bits or are within the capabilities of the mobile station, and judge there to be a notification if they are defined bits or are within the capabilities of the mobile station, or judge there to be no notification if they are undefined bits or are beyond the capabilities of the mobile station.

Here, if it is determined that a notification is present, one proceeds to step 4, and if it determined that there is no notification, one returns to step 2 to perform reception processing of the first part of the next HS-SCCH sub-frame.

In step 4, the HS-SCCH reception processing unit 35 is controlled to perform demodulation and decoding of the second part of HS-SCCH, and the HS-PDSCH reception processing unit 36 is controlled to perform demodulation and decoding of HS-PDSCH. Furthermore, preferably, the control unit 38 itself is set to avoid demodulation (decoding) of HS-SCCH.

Thus, the HS-SCCH reception processing unit 35 de-spreads and decodes the second and third slots which follow the first slot of HS-SCCH.

Furthermore, the HS-PDSCH reception processing unit 36 performs de-spreading using the de-spreading code indicated by HS-SCCH and performs decoding, such as turbo decoding, on HS-PDSCH, while is transmitted with a two-slot delay relative to HS-SCCH.

Once decoding of the second part of HS-SCCH is completed by the processing of step 4, the HS-SCCH reception processing unit 35 performs a CRC error check on the entire HS-SCCH sub-frame, and it is determined if the decision in step 3 was correct or not (step 5).

Here, if there was an error (if a CRC error is present), the detection of notification in step 3 is taken to be erroneous, so if HS-PDSCH demodulation and decoding was being executed, it is discontinued and one returns to step 2 to perform reception processing of the next HS-SCCH sub-frame.

The setting of HS-SCCH demodulation (decoding) avoidance, which was set in step 4, is preferably cancelled. Even if it is not canceller, there will be no operational problems, since avoidance will not be carried out if one does not proceed to step 7.

If it is determined in step 5 that there is no error (CRC error), one proceeds to step 7, determines if avoidance of demodulation or decoding of HS-SCCH has been completed, and if it is determined to have been completed, one returns to step 2, while if it has not been completed, one repeats the decision of the step 7 until it has been completed.

In other words, the control unit 38 gives a disable signal to the HS-SCCH reception processing unit 35, thereby controlling it such that demodulation or decoding of HS-SCCH is not performed until avoidance has been completed. In this case, the HS-PDSCH reception processing unit 36 is also controlled to not perform demodulation or decoding of HS-PDSCH until avoidance has been completed by giving it a disable signal.

Completion of avoidance can be determined by detecting the fact that at least demodulation or decoding was not carried out on a number of sub-frames corresponding to the number of repeats n (a natural number) indicated by the wireless base station or preset in the mobile station (e.g. stored in storage unit 37).

For example, subtracting the number, of sub-frames for which demodulation and decoding were avoided from n, avoidance can be judged to have been completed at the stage where n becomes 0.

Here, in addition to not demodulating and/or decoding all n sub-frames, one can also not demodulate and/or decode 1 out of n sub-frames. Furthermore, if n is 2 or greater, providing control such that demodulation and decoding is not performed on all sub-frames starting with the second of the n sub-frames will greatly reduce power consumption. This is because here, with respect to the first sub-frame, HS-SCCH error detection processing has not been completed, so demodulation of the first part could be initiated.

Finally, the case where the number of repeats is 1 will be described using FIG. 1.

In FIG. 1, when a message (notification) addressed to this mobile station is transmitted in the first sub-frame (A) of HS-SCCH, the mobile station transmits the reception result (ACK signal or NACK signal) in slot C of HS-DPCCH, and repeats the transmission of the same reception result once in slot D.

The wireless base station has transmitted data addressed to this mobile station in the first sub-frame E of HS-PDSCH, and thus performs control so that data is not transmitted to this mobile station in the following second sub-frame F, as was explained above.

Thus, it becomes possible to reduce power consumption by controlling the mobile station such that it does not perform demodulation or decoding on the second sub-frame B of HS-SCCH.

Here as well, if error detection processing of HS-SCCH is not completed on time before initiation of the reception processing for the next HS-SCCH sub-frame, reception processing of the next HS-SCCH may be initiated.

In other words, in cases where the error detection result for the first sub-frame A of HS-SCCH in FIG. 1 is output during reception of the first slot (first part) of the second sub-frame or the like, demodulation processing (de-spreading) of the first slot of the second sub-frame B will have been initiated already, so it would be preferable to either discontinue de-spreading and control the HS-SCCH reception processing unit 35 to not perform decoding after the error detection result was determined to be error-free, or else control the HS-SCCH reception processing unit 35 to discontinue decoding or not perform decoding.

In this way, by discontinuing the operation before reception processing (demodulation, decoding) of the first part has been fully completed, it becomes possible to at least somewhat reduce the power consumption of the HS-SCCH reception processing unit 35.

Figure 5:
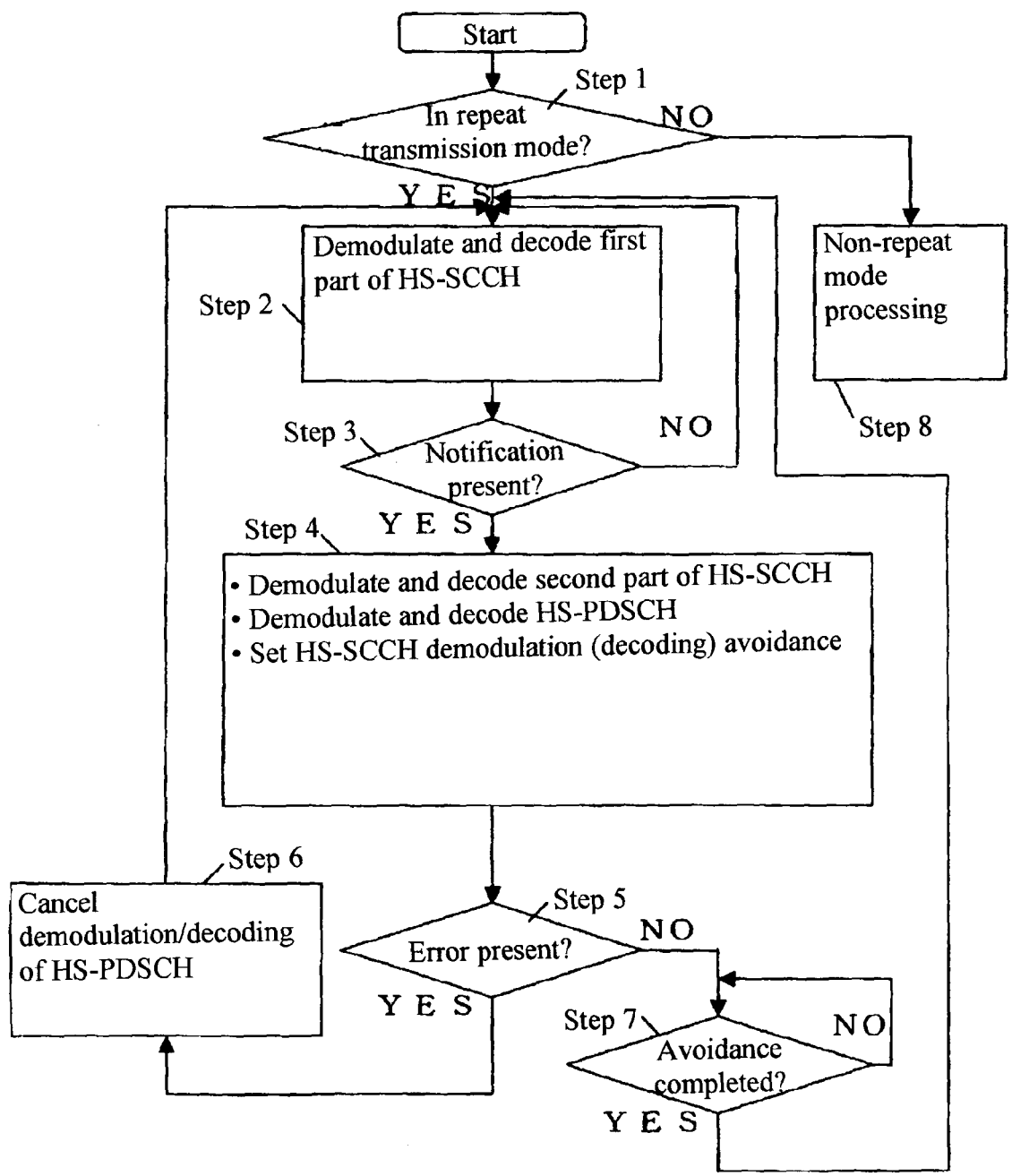
FIG. 5 is a drawing illustrating the HS-SCCH reception processing in the mobile station according to the present invention.

Under non-repeat mode processing of step 8, the processing of steps 2 through 7 of FIG. 5 would be performed while omitting step 4, in which HS-SCCH demodulation (decoding) avoidance is set, and step 7.

Furthermore, while in this example, HS-SCCH demodulation (decoding) avoidance was set in step 4, it also possible to not make this setting and rather execute the processing whereby demodulation and decoding is not performed (or is discontinued if demodulation or decoding has been initiated already) in step 7, for the number of HS-SCCH sub-frames corresponding to the number of repeats, if a determination of no error is made in step 5.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A mobile station which is able to receive a first datum and transmits a first reception result of the first datum at a first timing in response to reception of a first notification via a channel which notifies that data is to be transmitted, and is able to receive a second datum and transmits a second reception result of the second datum at a second timing in response to reception of a second notification via the channel at a different timing, the mobile station comprising:

a transmitter configured to transmit a first reception result of a datum whose transmission is notified by the first notification at the first timing and repeatedly transmit the first reception result at the second timing in response to reception of the first notification; and a control unit configured to impose a restriction on a reception processing of the channel, which notifies that data is to be transmitted, at the different timing assigned to the second notification upon reception of the first notification.

2. A mobile station as set forth in claim 1, wherein said restriction is a discontinuation of demodulation or decoding.

3. A mobile station as set forth in claim 1, wherein said restriction is that demodulation or decoding is not performed.

4. A mobile station, accommodated to HS-DPA, which upon detecting that a message addressed to the mobile station is transmitted via an HS-SCCH, receives a corresponding HS-PDSCH sub-frame, and which, when transmitting a reception result of the HS-PDSCH sub-frame, repeats the transmission of the reception result n times by using different HS-DPCCH subframes, the mobile station comprising: a control unit configured to restrict demodulation or decoding of a first part of a next HS-SCCH sub-frame, corresponding to a HS-DPCCH subframe in the different HS-DPCCH sub-frames, after an HS-SCCH sub-frame in which a message addressed to the mobile station is detected by the mobile station, wherein, when said n is 2 or greater, said control unit performs control such that demodulation and decoding are not carried out on the first part of the second and subsequent HS-SCCH sub-frames after the sub-frame on which said decoding was performed.

* * * * *